(12) United States Patent
Magoshi (10) Patent No.: US 6,751,707 B2
(45) Date of Patent: Jun. 15, 2004

(54) METHODS AND APPARATUS FOR CONTROLLING A CACHE MEMORY

(75) Inventor: Hidetaka Magoshi, Palo Alto, CA (US)

(73) Assignee: Sony Computer Entertainment Inc. (JP)

( * ) Notice: Subject to any disclaimer, the term of this patent is extended or adjusted under 35 U.S.C. 154(b) by 196 days.

(21) Appl. No.: 10/187,150

(22) Filed: Jul. 1, 2002

(65) Prior Publication Data

US 2003/0208661 A1 Nov. 6, 2003

Related U.S. Application Data (60) Provisional application No. 60/378,199, filed on May 6, 2002.

(51) Int. Cl.[7] .............................................. G06F 12/08
(52) U.S. Cl. ...................... 711/133; 711/144; 711/145; 711/156
(58) Field of Search ................................ 711/133, 144, 711/145, 156

(56) References Cited

U.S. PATENT DOCUMENTS

| | | | |
|---|---|---|---|
| 5,353,426 A | | 10/1994 | Patel et al. |
| 5,510,934 A | | 4/1996 | Brennan et al. |
| 2002/0083312 A1 | * | 6/2002 | Sinharoy ..................... 712/240 |
| 2002/0199151 A1 | * | 12/2002 | Zuraski ....................... 714/763 |

OTHER PUBLICATIONS

R. Riedlinger and T. Grutkowski, "The High-Bandwidth 256kB 2nd Level Cache on an Itanium Microprocessor," 2002 IEEE International Solid-State Circuits Conference, SSCC Digest of Technical Papers, pp. 418–419, Feb. 2002.

Various Figures of the 2002 IEEE International Solid-State Circuits Conference, SSCC Digest of Technical Papers, p. 478, Feb. 2002.

Webpage: http://www.cs.uwm.edu/~sandhya/CacheConcepts.html, pp. 1–6.

* cited by examiner

*Primary Examiner*—Hiep T. Nguyen
(74) *Attorney, Agent, or Firm*—Lerner, David, Littenberg, Krumholz & Mentlik, LLP (57) ABSTRACT

Methods and apparatus for controlling a cache memory are described in which the overwriting of floating point data into any cache line of the cache memory is prohibited when the data stored in such cache line are valid, integer data.

38 Claims, 4 Drawing Sheets

METHODS AND APPARATUS FOR CONTROLLING A CACHE MEMORY

CROSS REFERENCE TO RELATED APPLICATIONS

The present application claims the benefits of U.S. Provisional Patent Application No. 60/378,199, filed May 6, 2002, entitled METHODS AND APPARATUS FOR CONTROLLING A CACHE MEMORY, the entire disclosure of which is hereby incorporated by reference.

BACKGROUND OF THE INVENTION

The present invention relates to methods and apparatus for controlling a cache memory and, more particularly, to a control technique where storage of floating point data into the cache memory is prohibited when such storage would overwrite valid, integer data.

In recent years, there has been an insatiable desire for faster computer processing data throughputs because cutting-edge computer applications are becoming more and more complex, and are placing ever increasing demands on microprocessing systems. Conventional microprocessing systems (which employ a microprocessor and an associated memory) have very rapid cycle times (i.e., the unit of time in which a microprocessor is capable of manipulating data), such as one nanosecond. The time required to access data stored in main memory, however, may be considerably longer than the cycle time of the microprocessor. For example, the access time required to obtain a byte of data from a main memory (implemented utilizing dynamic random access memory, DRAM, technology) is on the order of about 60 nanoseconds.

In order to ameliorate the bottleneck imposed by the relatively long access time to DRAM memory, those skilled in the art have utilized cache memories. A cache memory augments the main memory in order to improve the throughput of the system. While the main memory is often implemented utilizing relatively inexpensive, slow, DRAM memory technology, the cache memory is typically implemented utilizing more expensive, fast, static random access memory (SRAM) technology. Given that the cache memory is implemented utilizing a high-cost technology, it is usually of a much smaller size than the main memory.

The cache memory may be disposed "on-chip" with the microprocessor, which is called a level-one (L1) cache memory, or it can be disposed separate, or off-chip, from the microprocessor, which is called a level-two (L2) cache memory. L1 cache memories usually have a much faster access time than L2 cache memories. A combined L1, L2 cache memory system also may be formed where both an on-chip cache memory and an off-chip cache memory are employed.

Due to the relatively small size of cache memories, conventional algorithms have been employed to determine what data should be stored in the cache memory at various times during the operation of the microproessing system. These conventional algorithms may be based on, for example, the theoretical concept of "locality of reference," which takes advantage of the fact that relatively small portions of an executable program are used by the microprocessor at any particular point in time. Thus, in accordance with the concept of locality of reference, only small portions of the executable program are stored in cache memory at any particular point in time. These or other algorithms may also be employed to control the storage and retrieval of data (which may be used by the executable program) in the cache memory.

The particularities of the known algorithms for taking advantage of locality of reference, or any other concept, for controlling the storage of executable programs and/or data in a cache memory are too numerous to present in this description. Suffice it to say, however, that any given algorithm may not be suitable in all applications as the data processing goals of various applications may differ significantly.

In some cases, a microprocessor system employing a cache memory may be required to process both integer and floating point data. Applications employing such floating point data may require very large floating point data arrays, which are much larger than the size capabilities of an L1 cache memory and which have very low address locality. Loading floating point data from such a large array may pollute the L1 cache memory, particularly when the L1 cache memory includes integer data, such as address pointers and the like. Conventional methods and apparatus that are designed to avoid corruption of the integer data of the L1 cache memory dictate that the L1 cache memory is not accessed when loading floating point data; rather, an L2 cache memory (or main memory) is directly accessed. Further details regarding this type of control may be found in U.S. Pat. No. 5,510,934, the entire disclosure of which is hereby incorporated by reference in its entirety.

Unfortunately, reduced access to the L1 cache memory as dictated by these conventional control techniques results in an overall lower throughput for the microprocessing system. Indeed, use of the very high speed of the L1 cache memory is not optimized and, in fact, such use is entirely avoided in favor of the slower L2 cache memory when loading floating point data.

Accordingly, there are needs in the art for new methods and apparatus for controlling a cache memory, which may include an L1 cache memory, an L2 cache memory and/or a combination thereof, in order to improve memory efficiency, increase processing throughput and improve the quality of the overall data processing performed by the system.

SUMMARY OF THE INVENTION

When a memory access request for floating point data cannot be satisfied by accessing the cache memory, i.e, when a cache miss occurs, it is desirable to execute a data refill sequence in which the floating point data is obtained from main memory and stored in the cache memory. When an L1 cache memory is employed and a memory access request for floating point data is made, it would be desirable to first access the L1 cache memory to satisfy the request and, if it cannot be satisfied, accessing an L2 cache memory or main memory to refill the L1 cache memory. In any case, when the microprocessing system is operating on both integer and floating point data, it is desirable to avoid overwriting valid integer data with floating point data in the L1 cache memory.

To this end, in accordance with one or more aspects of the present invention, a method for controlling a cache memory includes: receiving an address for at least one of storing data into and retrieving data from the cache memory, the address including tag bits and index bits; accessing one or more cache lines of the cache memory corresponding to the index bits of the address, each cache line including an address tag, a data valid flag, and a data type flag; determining whether data of at least one of the one or more cache lines is valid based on the data valid flag; determining what type of data have been stored in the at least one cache line based on the data type flag; and prohibiting overwriting floating point data into the at least one cache line when the data therein are valid, and the data that have been stored in the at least one cache line are integer data.

Preferably the method further includes: (i) setting the valid flag for the at least one cache line to indicate that the data therein are valid; and (ii) setting the data type flag for the at least one cache line to indicate that the data in the at least one cache line are of an integer type, when the overwriting of floating point data into the at least one cache line is prohibited.

It is noted that the data valid flag and/or the data type flag may be one-bit flags.

Preferably, the method further includes: permitting overwriting integer data into the at least one cache line when the data valid flag indicates that the at least one cache line does not contain valid data; setting the valid flag for the at least one cache line to indicate that the integer data are valid; and setting the data type flag for the at least one cache line to indicate that the integer data are of an integer type.

Alternatively, or in addition, the method may further include: permitting overwriting floating point data into the at least one cache line when the data valid flag indicates that the at least one cache line does not contain valid data; setting the valid flag for the at least one cache line to indicate that the floating point data are valid; and setting the data type flag for the at least one cache line to indicate that the floating point data are of a floating point type.

Alternatively, or in addition, the method preferably further includes permitting overwriting integer data into the at least one cache line when: (i) the data valid flag indicates that the at least one cache line contains valid data, and (ii) the data type flag indicates that the data of the at least one cache line are of an integer type. In this case, the method preferably further includes: setting the valid flag for the at least one cache line to indicate that the integer data are valid; and setting the data type flag for the at least one cache line to indicate that the integer data are of an integer type.

Alternatively, or in addition, the method preferably further includes permitting overwriting integer data into the at least one cache line when: (i) the data valid flag indicates that the at least one cache line contains valid data, and (ii) the data type flag indicates that the data of the at least one cache line are of a floating point type. In this case, the method preferably further includes: setting the valid flag for the at least one cache line to indicate that the integer data are valid; and setting the data type flag for the at least one cache line to indicate that the integer data are of an integer type.

Alternatively, or in addition to the above, the method preferably further includes permitting overwriting floating point data into the at least one cache line when: (i) the data valid flag indicates that the at least one cache line contains valid data, and (ii) the data type flag indicates that the data of the at least one cache line are of a floating point type. In this case, the method preferably further includes: setting the valid flag for the at least one cache line to indicate that the floating point data are valid; and setting the data type flag for the at least one cache line to indicate that the floating point data are of a floating point type.

When the cache memory is implemented utilizing N-way set associative technology, in which many cache lines may be invoked by a single memory access request for a piece of data, and in accordance with one or more further aspects of the present invention, the method preferably further includes: accessing all cache lines of the cache memory corresponding to the index bits of the address; determining which of the cache lines is valid based on the data valid flag; and permitting overwriting floating point data or integer data into any of the cache lines in which the corresponding data valid flag indicates that such cache lines do not contain valid data.

Alternatively, or in addition to the above, the method preferably further includes: accessing all cache lines of the cache memory corresponding to the index bits of the address; determining which of the cache lines is valid based on the data valid flag; and permitting overwriting integer data into any of the cache lines when all of the data valid flags indicate that the cache lines contain valid data.

The method preferably further includes: determining what type of data have been stored in each of the cache lines based on the respective data type flags; and permitting overwriting floating point data into any of the cache lines in which the corresponding data type flags indicate that the type of data that have been stored in such cache lines is floating point data when all of the data valid flags indicate that the cache lines contain valid data.

In addition, the method preferably further includes prohibiting overwriting floating point data into any of the cache lines when all of the data valid flags indicate that the cache lines contain valid data and all of the data type flags indicate that the cache lines contain integer data.

In accordance with one or more further aspects of the present invention, when the overwriting of the floating point data into any of the cache lines is prohibited, the method preferably further includes transferring the floating point data to a load/store unit or another cache memory. The other cache memory may include only one cache line.

In accordance with one or more further aspects of the present invention, the methods for controlling a cache memory described thus far, and/or described later in this document, may be achieved utilizing suitable hardware, such as that shown in the drawings hereinbelow. Such hardware may be implemented utilizing any of the known technologies, such as standard digital circuitry, analog circuitry, any of the known processors that are operable to execute software and/or firmware programs, one or more programmable digital devices or systems, such as programmable read only memories (PROMS), programmable array logic devices (PALS), any combination of the above, etc.

BRIEF DESCRIPTION OF THE DRAWINGS

For the purposes of illustrating the invention, there are shown in the drawings forms that are presently preferred, it is understood, however, that the invention is not limited to the precise arrangements and instrumentalities shown.

DETAILED DESCRIPTION

Figure 1:
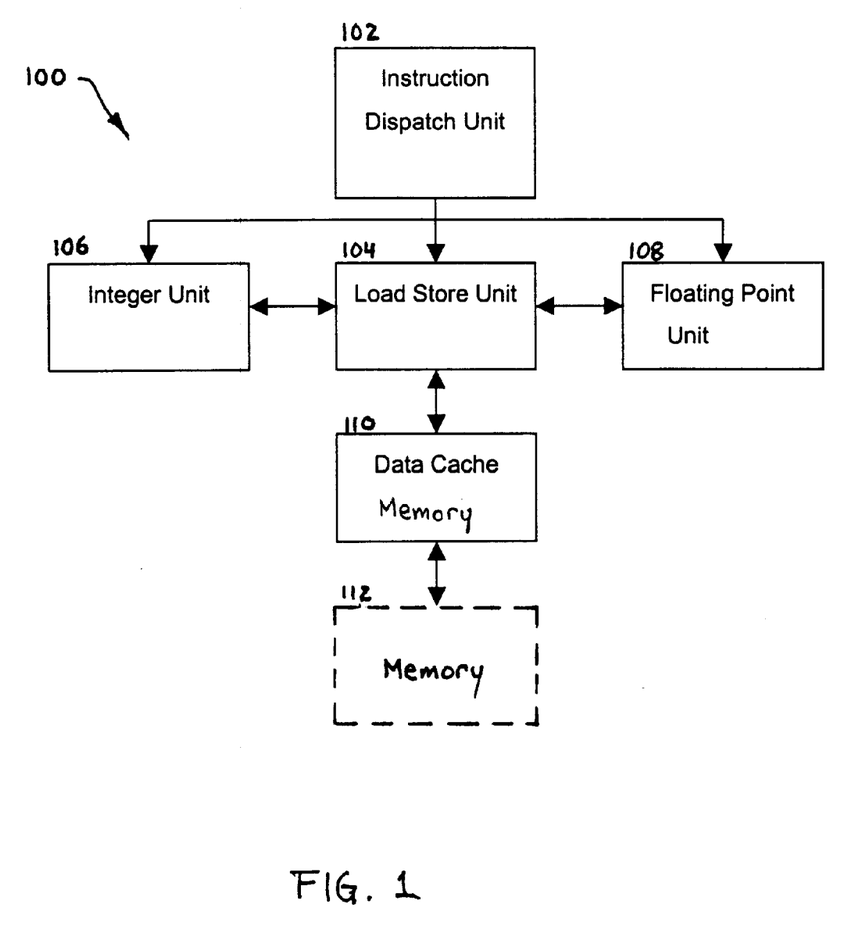
FIG. 1 is a block diagram showing aspects of apparatus (and/or aspects of methods) suitable for controlling a cache memory in accordance with one or more embodiments of the present invention.

With reference to the drawings, wherein like numerals indicate like elements, there is shown in FIG. 1 a block diagram illustrating one or more aspects of the present invention. For the purposes of brevity and clarity, the block diagram of FIG. 1 will be referred to and described herein as illustrating an apparatus 100, it being understood, however, that the description may be readily applied to various aspects of one or more methods with equal force. The apparatus 100 preferably represents a microprocessor and preferably includes an instruction dispatch unit 102, a load store unit 104, an integer unit 106, a floating point unit 108, a cache memory 110, and a further memory 112 (such as an L2 cache or main memory). These elements may be implemented separately and may be partitioned as shown, or they may be integrated or partitioned in various combinations without departing from the spirit and scope of the invention. Preferably, the elements illustrated in FIG. 1 form a portion of a microprocessor architecture and perform various actions/functions therein.

The instruction dispatch unit 102 preferably issues instructions for execution within the microprocessor 100. The instructions may require floating point data manipulations, integer data manipulations and/or combinations thereof. Therefore, the instructions are preferably provided to the integer unit 106 and/or the floating point unit 108 so that these respective units may carry out integer or floating point manipulations. The integer data and the floating point data that are to be manipulated by the integer unit 106 and the floating point unit 108, respectively, are stored in the cache memory 110, the further memory 112, or both.

The load store unit 104 preferably executes load and/or store operations respecting the integer unit 106 and the floating point unit 108 in accordance with the instruction received from the instruction dispatch unit 102. For example, when the instruction indicates that a floating point operation is to be carried out, the load store unit 104 preferably loads and/or stores floating point data to/from the floating point unit 108 by way of the cache memory 110. It is noted that the address will be provided using integer data from the integer unit 106. Alternatively, when the instruction indicates that an integer operation is to be carried out, the load store unit 104 preferably loads and/or stores integer data from/to the integer unit 106 by way of the cache memory 110.

More particularly, when the load store unit 104 is required to obtain integer and/or floating point data, it preferably accesses the cache memory 110 and, if a cache hit is achieved, the data are loaded from the cache memory 110 into the respective integer unit 106 and/or the floating point unit 108. On the other hand, if a cache miss occurs, the cache memory 110 preferably accesses the further memory 112, which, as discussed above, may be an L2 cache memory or main memory. In the case of a cache miss, the data obtained from the further memory 112 are refilled into the cache memory 110. After data manipulations within the integer unit 106 and/or the floating point 108 are carried out, store operations may be required in which the load store unit 104 stores data resulting from these operations into the cache memory 110. The particularities regarding data refill and data storage processes will be described hereinbelow.

Figure 2:
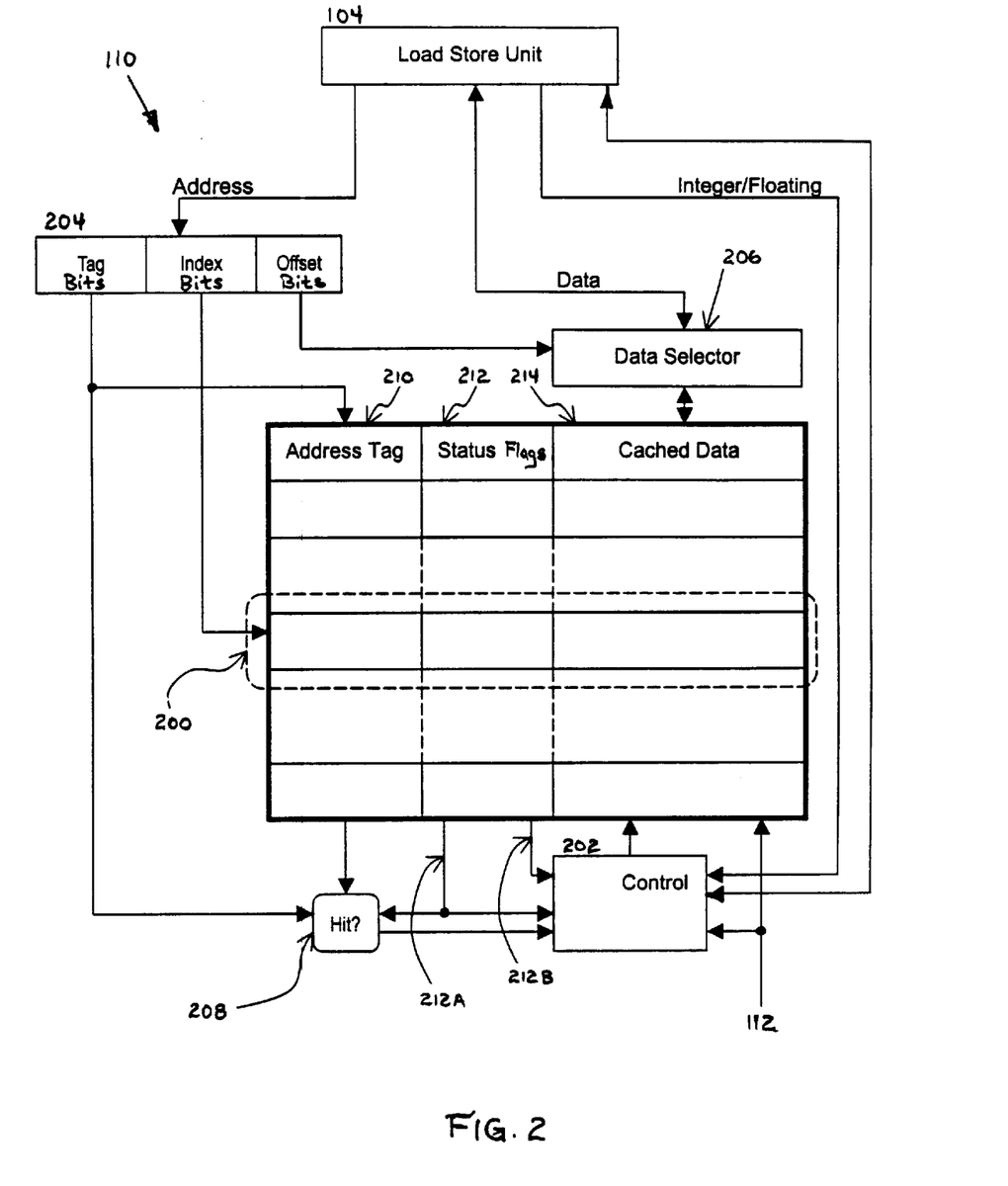
FIG. 2 is a block diagram showing further aspects of the apparatus of FIG. 1 (and/or further aspects of the methods) for controlling a cache memory in accordance with one or more further embodiments of the present invention.

Reference is now made to FIG. 2, which illustrates a block diagram showing further aspects of the present invention. More particularly, further details concerning the cache memory 110 and its control are provided. In accordance with the present invention, the cache memory 110 may be implemented utilizing fully associative mapping and/or set associative mapping. For the purposes of brevity and clarity, FIG. 2 illustrates a single set of cache lines 200, which may be part of a direct-mapped implementation and/or may be one "way" of an N-way set associative implementation. To the extent that the description herein refers to a single set of cache lines 200 and associated addressing, data, circuitry, etc., it is understood that such description may be readily applied to an N-way set associative implementation (or vice versa) without departing from the spirit and scope of the invention.

Turning now to the details illustrated in FIG. 2, the cache memory 110 preferably includes a plurality of cache lines 200, a memory controller 202, an addressing function or capability 204, a data selector 206, and a comparing function 208. The data are loaded from, or stored into, the cache lines 200 by way of the data selector 206 in accordance with an algorithm carried out by the memory controller 202. The cache lines 200 are accessed in accordance with address information received from the load store unit 104 and processed according to the addressing function 204. In particular, the address information preferably includes tag bits, index bits, and offset bits. The tag bits are used to identify (or name) the desired data and to compare with an identifier stored within a particular cache line 200. The index bits provide a pointer to a particular cache line 200 within the set, and the offset bits identify a starting location within the data storage portion of the cache line 200.

Each cache line 200 preferably includes an address tag 210, status flags 212, and data 214. The address tag 210 is utilized to name or identify the data stored at the respective cache line 200. The status flags 212 are used to provide certain information concerning the data stored in the cache line 200. The status flags 212 may include a data valid flag 212A and a data type flag 212B. The data valid flag 212A preferably provides information, concerning whether or not the data stored within the cache line 200 is valid. The data valid flag 212A may be a single bit of information, where a logic high ("1," "true," "set," etc.) indicates that the data are valid, and a logic low ("0," "false," "not set," etc.) indicates that the data are invalid (or vice versa). The data type flag 212B preferably includes information indicative of whether the stored data of the cache line 200 is integer data or floating point data. The data type flag 212B may be a single bit of information, where a logical high indicates that the data are floating point data, and a logic low indicates that the data are integer data (or vice versa). The status flags 212 may include other information, such as whether the data stored in the cache line 200 are "dirty" (i.e., where the data have been altered and the main memory has not been updated, etc.)

Figure 3:
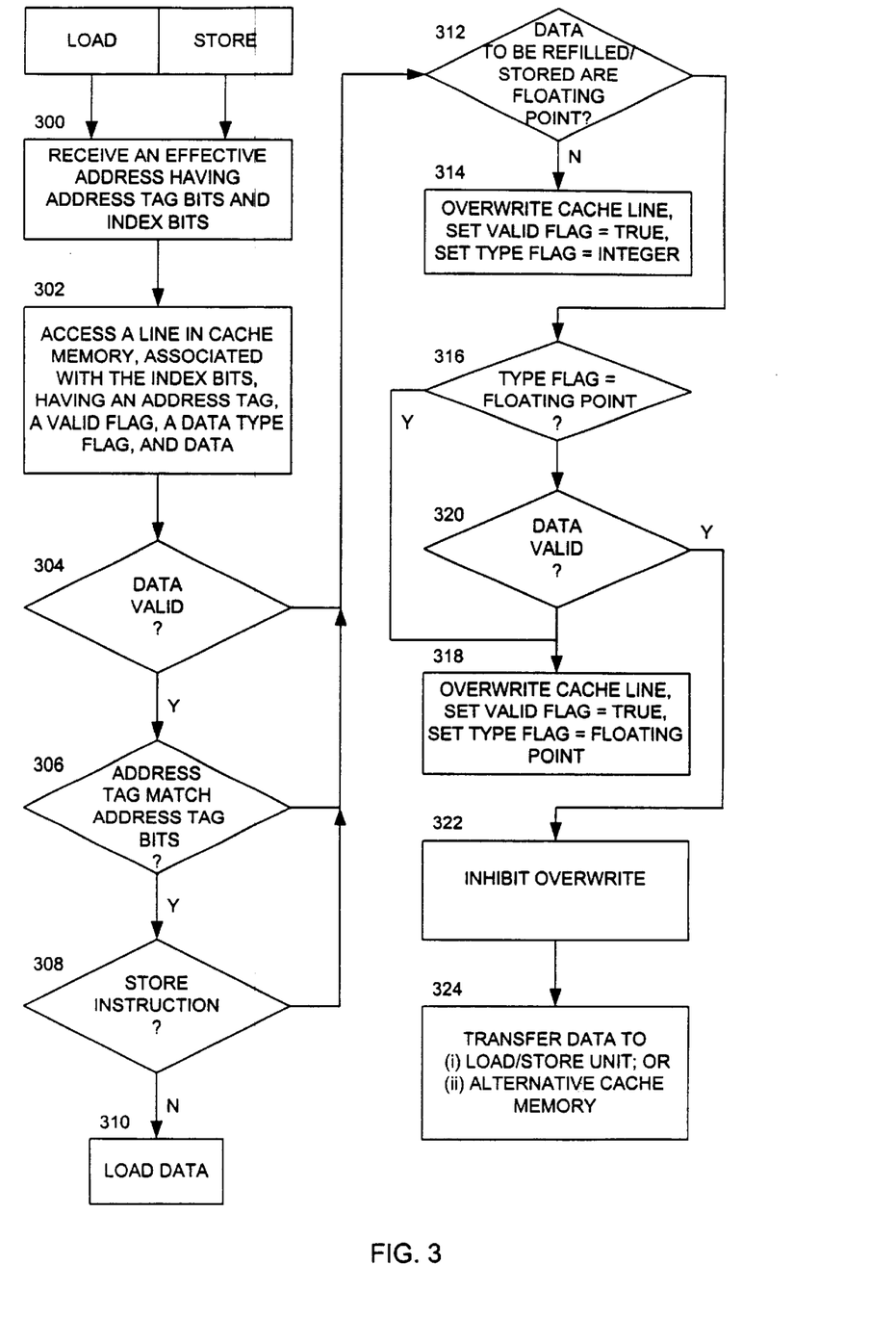
FIG. 3 is flow diagram illustrating certain actions/functions that may be carried out and/or implemented in accordance with one or more further aspects of the present invention, such as those illustrated in FIGS. 1 and 2.

With reference to FIGS. 2 and 3, a description of certain aspects of the invention concerning the control of the cache memory 110 will now be made. At action 300, the cache memory 110 receives an address, such as an effective address, from the load store unit 104. As noted above, the address includes tag bits, index bits and offset bits. The index bits point to a particular cache line 200 within the set (action 302), where the cache line includes an address tag 210, status flags 212 and data 214. At action 304, the memory controller 202 analyzes the data valid flag 212A to determine whether the data stored in the cache line 200 are valid. If the data are not valid, then the process flow preferably branches to action 312 (which will be discussed later in this description). If the data are valid, then the process flow preferably branches to action 306.

At action 306, the comparing function 208 (which may be integral with, or separate from, the memory controller 202) compares the tag bits contained in the address received from the load store unit 104 with the address tag 210 of the cache line 200. When the tag bits of the requested address do not match the address tag 210 of the cache line 200, then the process flow preferably branches to action 312 (which will be discussed later in this description.) On the other hand, when the tag bits of the requested address match the address tag 210 of the cache line 200, then the process flow preferably branches to action 308.

At action 308 an inquiry is made as to whether the load store unit 104 is servicing a load instruction or a store instruction. If the load store unit 104 is servicing a load instruction (i.e., data are being obtained from the cache memory 112 for delivery to the integer unit 106 or the floating point unit 108), then a cache hit is obtained and the process flow advances to action 310 where the data are loaded from the cache line 200 to the load store unit 104 by way of the data selector 206. If, at action 308, it is determined that the load store unit 104 is servicing a store instruction, then a cache hit still obtains, but the process flow preferably branches to action 312, which will now be discussed.

It is noted that when the process flow branches to action 312 from action 304 or action 306 and the load store unit 104 is servicing a load instruction, then a data refill is to be made (i.e., the data requested by the load store unit 104 are not contained in the cache memory 110). In this case, the requested data are obtained from the further memory 112 (which, as discussed above, may be an L2 cache memory or main memory). When the process flow branches to action 312 from action 308, the load store unit 104 is servicing a store instruction, where data are being written into the cache memory 110, e.g., as a result of an operation carried out by the integer unit 106 or the floating point unit 108. Irrespective of whether a refill or store operation is being carried out, at this stage in the process, the memory controller 202 preferably determines whether an overwrite of data into a cache line 200 is permitted or prohibited based on the data valid flag 212A, the data type flag 212B and/or the type of data (i.e., integer or floating point) that is to be stored into the cache line 200.

For the purposes of discussion, the basic algorithm for controlling the overwriting of data into the cache line 200 is tabulated in Table 1. It is noted that the algorithm of Table 1 may be illustrated in any number of differing process flow diagrams. To illustrate all of these alternative flow diagrams would sacrifice clarity and brevity and, therefore, only one example of such process flow diagrams is show in FIG. 3.

TABLE 1

| DATA VALID FLAG | DATA TYPE FLAG | DATA TYPE | MEMORY CONTROL |
| --- | --- | --- | --- |
| 0 | X | I | Overwrite |
| 0 | X | FP | Overwrite |
| 1 | 0 | I | Overwrite |
| 1 | 0 | FP | Inhibit Overwrite |
| 1 | 1 | I | Overwrite |
| 1 | 1 | FP | Overwrite |

Referring now to FIGS. 2 and 3, and Table 1, at action 312, the memory controller 202 preferably makes a determination as to the type of data to be stored into the cache line 200. By way of example, information concerning the type of data to be stored may be obtained from the load store unit 104 because the instruction received by the load store unit (FIG. 1) preferably includes such information. When the data to be stored in the cache line 200 are floating point data, then the process flow preferably advances to action 316 (which will be discussed later). When the data to be stored in the cache line 200 are not floating point data (i.e., the data are integer data), then the process flow preferably advances to action 314, where any data of the cache line 200 are overwritten with the integer data. This corresponds with lines 1, 3, and 5 of Table 1. In particular, lines 1, 3, and 5 of Table 1 indicate that an overwrite should be permitted irrespective of the state of the data valid flag 212A and the data type flag 212B, so long as the type of data to be stored in the cache line 200 is integer data. Turning again to action 314 of FIG. 3, when the cache line 200 is overwritten with the integer data, the data valid flag 212A is preferably set, e.g., to a logic high (true state) to indicate valid data and the data type flag 212B is preferably set, e.g., to a logical low (false state) to indicate integer data.

When it has been determined that the data to be stored in the cache line 200 are floating point data (action 312 affirmative), then the process preferably flows to action 316 where a determination is made as to whether the data type flag 212B indicates that the data that has previously been stored in the cache line 200 (e.g., the data that currently are stored in the cache line 200) are floating point data. If this inquiry is negative, then the process flow preferably advances to action 320 (which will be discussed later). If this determination is affirmative, then the process flow preferably advances to action 318, where overwriting of the data in the cache line 200 is permitted. This corresponds to line 6 of Table 1, where the data valid flag 212A indicates that the data currently stored in the cache line 200 are valid (although this is not determinative), the data type flag 212B indicates that the type of data currently stored in the cache line 200 is floating point data, and the type of data to be stored in the cache line 200 is also floating point data. This also corresponds to line 2 of Table 1, where the data valid flag 212A indicates that the data currently stored in the cache line 200 are not valid (although this is not determinative), the data type flag 212B indicates that the data currently stored in the cache line 200 are floating point data, and the type of data to be stored into the cache line 200 is floating point data.

If, at action 316, it is determined that the data type flag 212B indicates that the data currently stored in the cache line 200 are integer data, then the process preferably flows to action 320 where it is determined whether the integer data currently stored in the cache line 200 are valid. (It is noted that this validity determination may have been previously made and the information carried over from action 304 or it may be newly determined.) When such integer data are not valid, e.g., the data valid flag 212A is a logic low (false state), then the process flow preferably advances to action 318 where, as discussed above, overwriting the floating point data into the cache line 200 is permitted. This corresponds to line 2 of Table 1, where the data valid flag 212A indicates that the data currently stored in the cache line 200 are not valid and the data type flag 212B indicates that such data are integer data. Turning again to FIG. 3, the memory controller 202 preferably sets the data valid flag 212A for the cache line 200, e.g., to a logic high, true state. Further, the memory controller 202 preferably sets the data type flag 212B to indicate floating point data, e.g., to a logic high, true state.

If the inquiry at action 320 is affirmative, i.e., that the integer data currently stored in the cache line 200 are valid, then the process flow preferably advances to action 322, where the overwriting of the floating point data into the cache line 200 is prohibited. This corresponds to line 4 of Table 1, where the data valid flag 212A indicates that the data currently stored in the cache line 200 are valid, the data type flag 212B indicates that the data are integer data, and the type of data to be stored in the cache line 200 is floating point data. Advantageously, the memory controller 202 prevents writing floating point data over valid integer data in the cache memory 110.

If such floating point data are prohibited from being written over valid integer data of the cache line 200, then such data is preferably transferred to the load store unit 104 or stored in an alternative cache memory (action 324).

Figure 4:
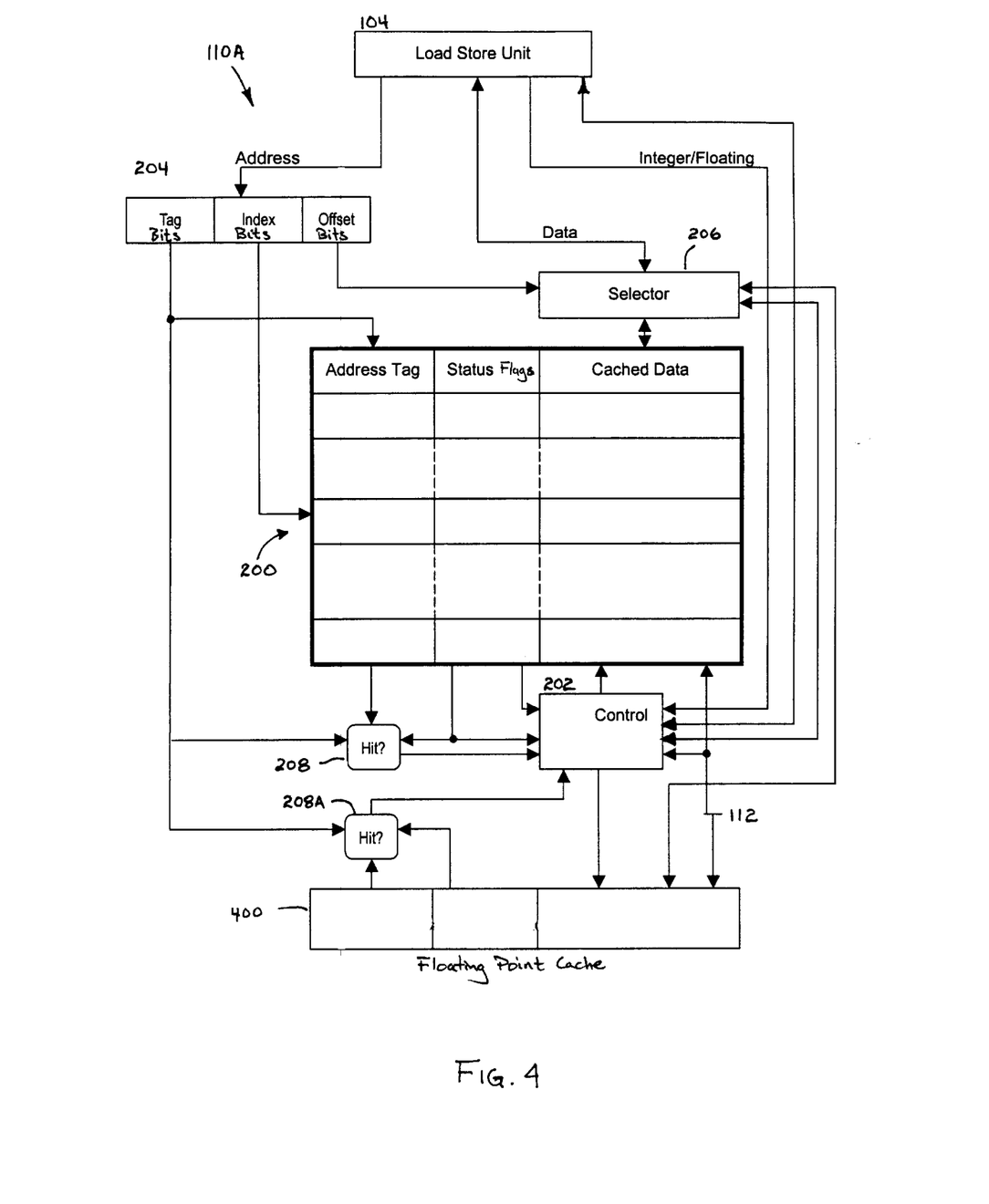
FIG. 4 is a block diagram showing further aspects of an apparatus (and/or further aspects of the methods) for controlling a cache memory in accordance with one or more further embodiments of the present invention.

Reference is now made to FIG. 4, which is a block diagram illustrating further aspects of the present invention. In particular, FIG. 4 illustrates an alternative cache memory 110A, which is substantially similar to the cache memory 110 shown in FIG. 2 with the exception of including the capability of transferring floating point data to an alternative cache memory 400. The alternative cache memory 400 may be integral with the cache memory 110A or separate therefrom. It is noted that the alternative cache memory 400 acts as an extension of the set of cache lines 200. Accordingly, a further comparing function 208A is included to determine whether the tag bits of the requested address match the address tag contained in a particular cache line 200 of the alternative cache memory 400. It is noted that the alternative cache memory 400 may include a single cache line or multiple cache lines.

As discussed above, the various aspects of the methods and apparatus of the present invention may be applied to a single set, direct-mapped, cache memory implementation or may be utilized in an N-way set associative cache memory implementation.

With reference to FIG. 3, in the case of an N-way set associative cache memory implementation, at action 304 all cache lines 200 associated with the given index bits are accessed and a determination of which of these cache lines 200 are valid is made based on the respective data valid flags 212A. The memory controller 202 preferably permits overwriting floating point data or integer data into any of the cache lines 200 in which the corresponding data valid flag 212A indicates that such cache lines 200 do not contain valid data. When all of the cache lines 200 contain valid data (e.g., all associated data valid flags 212A are true), any cache line 200 may be overwritten if the type of data to be stored is integer data. If the type of data to be stored is floating point data, then such data may only be stored in a cache line 200 in which the data type flag 212B indicates that the data currently stored in that cache line 200 are floating point data. In the event that all cache lines 200 associated with the index bits contain valid data (e.g., all data valid flags 212A are true), and all associated data type flags 212B indicate that the data stored are integer data, then the memory controller 202 preferably prohibits the overwriting of floating point data into any of the cache lines 200.

Advantageously, the methods and apparatus for controlling the cache memory as described hereinabove increase the use of an L1 cache memory in a microprocessing system that manipulates both integer and floating point data. Consequently, improvements in memory efficiency, processing throughput and quality of data processing are obtained.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method of controlling a cache memory, comprising:
receiving an address for at least one of storing data into and retrieving data from the cache memory, the address including tag bits and index bits;
accessing one or more cache lines of the cache memory corresponding to the index bits of the address, each cache line including an address tag, a data valid flag, and a data type flag;
determining whether data of at least one of the one or more cache lines is valid based on the data valid flag;
determining what type of data have been stored in the at least one cache line based on the data type flag; and
prohibiting overwriting floating point data into the at least one cache line when the data therein are valid, and the data that have been stored in the at least one cache line are integer data.

2. The method of claim 1, further comprising: (i) setting the valid flag for the at least one cache line to indicate that the data therein are valid; and (ii) setting the data type flag for the at least one cache line to indicate that the data in the at least one cache line are of an integer type, when the overwriting of floating point data into the at least one cache line is prohibited.

3. The method of claim 1, wherein at least one of the data valid flag and the data type flag are one-bit flags.

4. The method of claim 1, further comprising:
permitting overwriting integer data into the at least one cache line when the data valid flag indicates that the at least one cache line does not contain valid data;
setting the valid flag for the at least one cache line to indicate that the integer data are valid; and
setting the data type flag for the at least one cache line to indicate that the integer data are of an integer type.

5. The method of claim 1, further comprising:
permitting overwriting floating point data into the at least one cache line when the data valid flag indicates that the at least one cache line does not contain valid data;
setting the valid flag for the at least one cache line to indicate that the floating point data are valid; and
setting the data type flag for the at least one cache line to indicate that the floating point data are of a floating point type.

6. The method of claim 1, further comprising permitting overwriting integer data into the at least one cache line when: (i) the data valid flag indicates that the at least one cache line contains valid data, and (ii) the data type flag indicates that the data of the at least one cache line are of an integer type.

7. The method of claim 6, further comprising at least one of:
setting the valid flag for the at least one cache line to indicate that the integer data are valid; and
setting the data type flag for the at least one cache line to indicate that the integer data are of an integer type.

8. The method of claim 1, further comprising permitting overwriting integer data into the at least one cache line when: (i) the data valid flag indicates that the at least one cache line contains valid data, and (ii) the data type flag indicates that the data of the at least one cache line are of a floating point type.

9. The method of claim 8, further comprising at least one of:
setting the valid flag for the at least one cache line to indicate that the integer data are valid; and setting the data type flag for the at least one cache line to indicate that the integer data are of an integer type.

10. The method of claim 1, further comprising permitting overwriting floating point data into the at least one cache line when: (i) the data valid flag indicates that the at least one cache line contains valid data, and (ii) the data type flag indicates that the data of the at least one cache line are of a floating point type.

11. The method of claim 10, further comprising at least one of:
setting the valid flag for the at least one cache line to indicate that the floating point data are valid; and
setting the data type flag for the at least one cache line to indicate that the floating point data are of a floating point type.

12. The method of claim 1, further comprising: transferring the floating point data to a load/store unit or another cache memory when the overwriting of the floating point data into the at least one cache line is prohibited.

13. The method of claim 12, wherein the other cache memory includes only one cache line.

14. The method of claim 1, further comprising:
accessing all cache lines of the cache memory corresponding to the index bits of the address;
determining which of the cache lines is valid based on the data valid flag; and
permitting overwriting floating point data or integer data into any of the cache lines in which the corresponding data valid flag indicates that such cache lines do not contain valid data.

15. The method of claim 1, further comprising:
accessing all cache lines of the cache memory corresponding to the index bits of the address;
determining which of the cache lines is valid based on the data valid flag; and
permitting overwriting integer data into any of the cache lines when all of the data valid flags indicate that the cache lines contain valid data.

16. The method of claim 15, further comprising:
determining what type of data have been stored in each of the cache lines based on the respective data type flags; and
permitting overwriting floating point data into any of the cache lines in which the corresponding data type flags indicate that the type of data that have been stored in such cache lines is floating point data when all of the data valid flags indicate that the cache lines contain valid data.

17. The method of claim 16, further comprising: prohibiting overwriting floating point data into any of the cache lines when all of the data valid flags indicate that the cache lines contain valid data and all of the data type flags indicate that the cache lines contain integer data.

18. The method of claim 17, further comprising: transferring the floating point data to a load/store unit or another cache memory when the overwriting of the floating point data into any of the cache lines is prohibited.

19. The method of claim 18, wherein the other cache memory includes only one cache line.

20. An apparatus for controlling a cache memory, comprising:
an address memory operable to receive an address for at least one of storing data into and retrieving data from the cache memory, the address including tag bits and index bits; and
a memory controller operable to: (i) access one or more cache lines of the cache memory corresponding to the index bits of the address, each cache line including an address tag, a data valid flag, and a data type flag, (ii) determine whether data of at least one of the one or more cache lines is valid based on the data valid flag, (iii) determine what type of data have been stored in the at least one cache line based on the data type flag, and (iv) prohibit overwriting floating point data into the at least one cache line when the data therein are valid, and the data that have been stored in the at least one cache line are integer data.

21. The apparatus of claim 20, wherein the memory controller is further operable to: (i) set the valid flag for the at least one cache line to indicate that the data therein are valid; and (ii) set the data type flag for the at least one cache line to indicate that the data in the at least one cache line are of an integer type, when the overwriting of floating point data into the at least one cache line is prohibited.

22. The apparatus of claim 20, wherein at least one of the data valid flag and the data type flag are one-bit flags.

23. The apparatus of claim 20, wherein the memory controller is further operable to: (i) permit overwriting integer data into the at least one cache line when the data valid flag indicates that the at least one cache line does not contain valid data; (ii) set the valid flag for the at least one cache line to indicate that the integer data are valid; and (iii) set the data type flag for the at least one cache line to indicate that the integer data are of an integer type.

24. The apparatus of claim 20, wherein the memory controller is further operable to: (i) permit overwriting floating point data into the at least one cache line when the data valid flag indicates that the at least one cache line does not contain valid data; (ii) set the valid flag for the at least one cache line to indicate that the floating point data are valid; and (iii) set the data type flag for the at least one cache line to indicate that the floating point data are of a floating point type.

25. The apparatus of claim 20, wherein the memory controller is further operable to permit overwriting integer data into the at least one cache line when: (i) the data valid flag indicates that the at least one cache line contains valid data, and (ii) the data type flag indicates that the data of the at least one cache line are of an integer type.

26. The apparatus of claim 25, wherein the memory controller is further operable to at least one of: (i) set the valid flag for the at least one cache line to indicate that the integer data are valid; and (ii) set the data type flag for the at least one cache line to indicate that the integer data are of an integer type.

27. The apparatus of claim 20, wherein the memory controller is further operable to permit overwriting integer data into the at least one cache line when: (i) the data valid flag indicates that the at least one cache line contains valid data, and (ii) the data type flag indicates that the data of the at least one cache line are of a floating point type.

28. The apparatus of claim 27, wherein the memory controller is further operable to at least one of: (i) set the valid flag for the at least one cache line to indicate that the integer data are valid; and (ii) set the data type flag for the at least one cache line to indicate that the integer data are of an integer type.

29. The apparatus of claim 20, wherein the memory controller is further operable to permit overwriting floating point data into the at least one cache line when: (i) the data valid flag indicates that the at least one cache line contains valid data, and (ii) the data type flag indicates that the data of the at least one cache line are of a floating point type.

30. The apparatus of claim 29, wherein the memory controller is further operable to at least one of: (i) set the valid flag for the at least one cache line to indicate that the floating point data are valid; and (ii) set the data type flag for the at least one cache line to indicate that the floating point data are of a floating point type.

31. The apparatus of claim 20, wherein the memory controller is further operable to transfer the floating point data to a load/store unit or another cache memory when the overwriting of the floating point data into the at least one cache line is prohibited.

32. The apparatus of claim 31, wherein the other cache memory includes only one cache line.

33. The apparatus of claim 20, wherein the memory controller is further operable to: (i) access all cache lines of the cache memory corresponding to the index bits of the address; (ii) determine which of the cache lines is valid based on the data valid flag; and (iii) permit overwriting floating point data or integer data into any of the cache lines in which the corresponding data valid flag indicates that such cache lines do not contain valid data.

34. The apparatus of claim 20, wherein the memory controller is further operable to: (i) access all cache lines of the cache memory corresponding to the index bits of the address; (ii) determine which of the cache lines is valid based on the data valid flag; and (iii) permit overwriting integer data into any of the cache lines when all of the data valid flags indicate that the cache lines contain valid data.

35. The apparatus of claim 34, wherein the memory controller is further operable to: (i) determine what type of data have been stored in each of the cache lines based on the respective data type flags; and (ii) permit overwriting floating point data into any of the cache lines in which the corresponding data type flags indicate that the type of data that have been stored in such cache lines is floating point data when all of the data valid flags indicate that the cache lines contain valid data.

36. The apparatus of claim 35, wherein the memory controller is further operable to prohibit overwriting floating point data into any of the cache lines when all of the data valid flags indicate that the cache lines contain valid data and all of the data type flags indicate that the cache lines contain integer data.

37. The apparatus of claim 36, wherein the memory controller is further operable to transfer the floating point data to a load/store unit or another cache memory when the overwriting of the floating point data into any of the cache lines is prohibited.

38. The apparatus of claim 37, wherein the other cache memory includes only one cache line.

* * * * *